(12) United States Patent
Grehant

(10) Patent No.: US 7,777,637 B2
(45) Date of Patent: Aug. 17, 2010

(54) METHOD FOR SETTING A SAFETY THRESHOLD ABOVE WHICH AN AWNING SHOULD BE WOUND UP

(75) Inventor: Bernard Grehant, Nancy-sur-Cluses (FR)

(73) Assignee: Somfy SAS, Cluses (FR)

( * ) Notice: Subject to any disclaimer, the term of this patent is extended or adjusted under 35 U.S.C. 154(b) by 224 days.

(21) Appl. No.: 11/953,123

(22) Filed: Dec. 10, 2007

(65) Prior Publication Data
US 2008/0150743 A1 Jun. 26, 2008

(30) Foreign Application Priority Data
Dec. 26, 2006 (FR) .................................. 06 11368

(51) Int. Cl.
*G08B 21/00* (2006.01)
(52) U.S. Cl. .................. 340/669; 340/665; 340/683; 340/545.8; 318/460; 318/466; 318/480
(58) Field of Classification Search ............ 340/669, 340/665, 670, 683, 815.6, 545.8; 318/266, 318/286, 460, 466, 480; 160/22, 45, 66, 160/67
See application file for complete search history.

(56) References Cited

U.S. PATENT DOCUMENTS

| | | | |
|---|---|---|---|
| 5,038,087 A * | 8/1991 | Archer et al. | 318/469 |
| 5,850,131 A * | 12/1998 | Wolfer et al. | 318/466 |
| 6,798,158 B2 * | 9/2004 | Evans | 318/266 |
| 7,207,217 B2 | 4/2007 | Orsat | |
| 7,242,162 B2 | 7/2007 | Goth | |

FOREIGN PATENT DOCUMENTS

| | | |
|---|---|---|
| DE | G 9306368.7 U | 8/1993 |
| EP | 1 659 256 A | 5/2006 |
| FR | 2811431 A | 1/2002 |

\* cited by examiner

*Primary Examiner*—Hung T. Nguyen
(74) *Attorney, Agent, or Firm*—Frommer Lawrence & Haug LLP; Ronald R. Santucci

(57) ABSTRACT

A method for setting a safety threshold that triggers the sending, by an acceleration or movement sensor device (20), of a safety signal that causes a safety movement of a motorized screen (11) used as a closure or as a sunshade or for privacy, said method comprising the following steps:
  manual shaking of the screen,
  recording of a signal produced by a sensor means (33) during the manual shaking step, and
  determination of the safety threshold from this recording.

8 Claims, 2 Drawing Sheets

METHOD FOR SETTING A SAFETY THRESHOLD ABOVE WHICH AN AWNING SHOULD BE WOUND UP

This application claims priority benefits from French Patent Application No. FR 06 11368 filed Dec. 26, 2006, the disclosure of which is hereby incorporated by reference.

BACKGROUND OF THE INVENTION

The invention relates to a method for setting a safety threshold that triggers the sending, by an acceleration or movement sensor device, of a safety signal that causes a safety movement of a motorized screen used as a closure or as a sunshade or for privacy. The invention also relates to an acceleration or movement sensor device for implementing such a method.

DESCRIPTION OF THE PRIOR ART

It is known practice to use a vibration sensor comprising, for example, an accelerometer, to detect movements caused by the wind on a mobile structure such as an awning. The sensor is mounted on the mobile structure at a point where the wind effects are particularly important. It also includes a device that analyzes the signals produced by the accelerometer and a radio transmitter to send to a motor control unit a command to wind the awning up when the vibration level exceeds a predetermined threshold.

Such a device is known for example from application FR 2 811 431.

Document EP 1 659 256 describes a similar sensor for detecting the presence of wind and controlling a sunshade installation accordingly.

One problem with this type of sensor is how to set adjustment thresholds (to adjust the degree of sensitivity of the sensor), because it is important that the sensor should have a completely watertight housing since the mobile structure, which is sensitive to wind action, is also exposed to weather, moisture and salt fogs. The means for setting the threshold or thresholds can only be got at after the housing has been disassembled, which usually means removing the sensor from the structure.

Furthermore, setting a preset potentiometer contained in a closed housing is a difficult task. But on the other hand, making the control of the potentiometer accessible from the outside significantly increases the cost, because of the need for water tightness.

It is an object of the invention to provide a method for setting a sensor device that overcomes the drawbacks cited above and improves the known setting methods of the prior art. In particular, the invention proposes a simple setting method that limits the work on the sensor device. The invention further relates to a sensor device for implementing such a setting method.

SUMMARY OF THE INVENTION

The setting method according to the invention is defined in claim 1.

Various embodiments of the setting method are defined in claims 2-7.

The sensor device according to the invention is defined in claim 8.

DESCRIPTION OF THE DRAWINGS

The appended drawing shows, by way of example, an embodiment of a sensor device according to the invention and a way of carrying out a method of setting a sensor device according to the invention.

DESCRIPTION OF THE PREFERRED EMBODIMENTS

Figure 1:
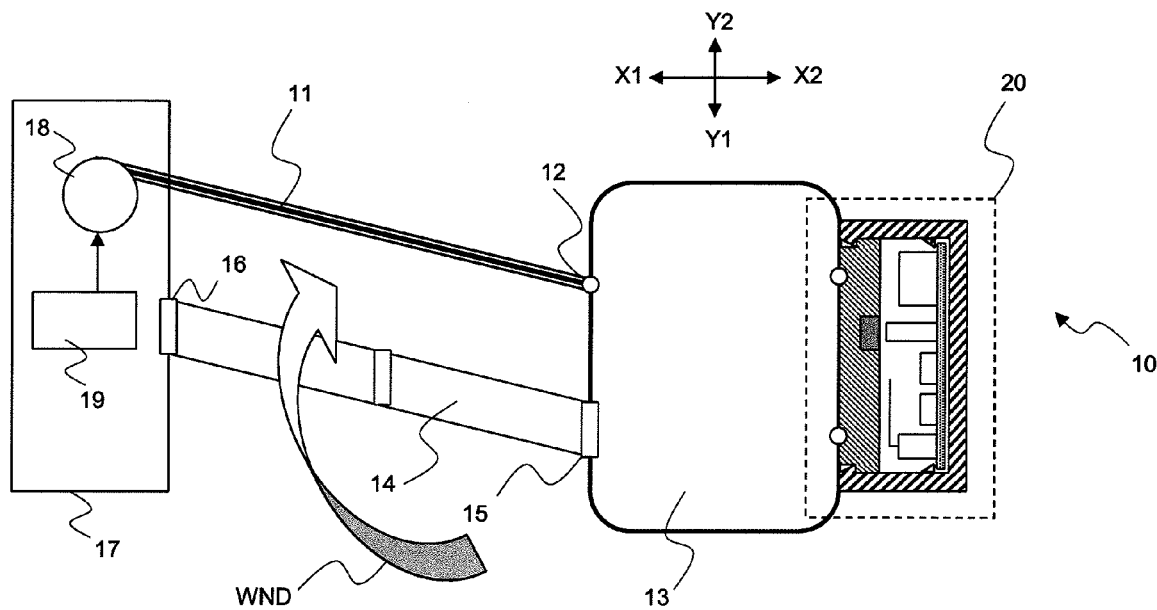
FIG. 1 is a diagram of an installation comprising a sensor device according to the invention.

FIG. 1 shows an installation 10 comprising a motorized awning in which the fabric 11 is attached by a fixing 12 to a load bar 13. The fabric is wound onto a motorized tube 18. When the motor winds the fabric onto the winding tube, the fabric moves the load bar 13 in direction X1, and, to a lesser extent, in direction Y2. A plurality of spring-loaded hinged arms 14 apply a force to the load bar 13 in direction X2 and, to a lesser extent, in direction Y1 so as to keep the fabric taut. The hinged arm 14 is connected to the load bar by a first hinge 15. The hinged arm comprises other hinges, in particular a second hinge 16 connecting it to the fixed structure 17 of the installation, which comprises the motorized winding tube. Load bar, fabric and jointed arms constitute the mobile structure.

The installation 10 also comprises a sensor device 20 mounted on the load bar 13. The sensor device 20 could be located anywhere such that the wind (represented by a solid arrow WND) acting on the fabric 11 causes the mobile structure, and in particular the location where the sensor device is situated, to move about. The sensor device 20 transmits a safety signal to a control unit 19. This control unit generates the commands which control the motorized tube. The control unit comprises a radiofrequency receiver with an antenna, and optionally some sort of weather sensor.

Figure 2:
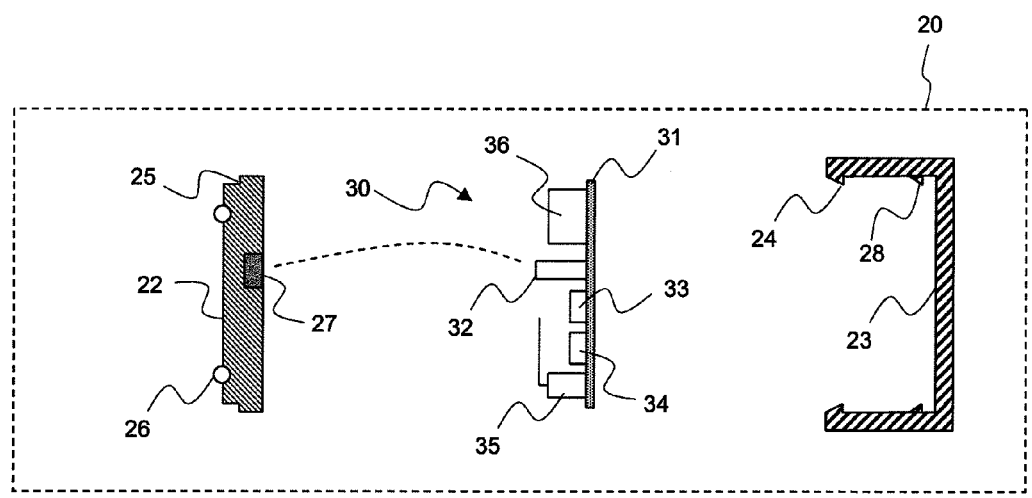
FIG. 2 is an exploded diagram of a sensor device according to the invention.

FIG. 2 details the components comprised in the sensor device 20. In the preferred embodiment, the sensor device comprises a base 22 mounted on the mobile structure, and a removable part 23 forming a cover and comprising the electronic components of the sensor device.

The cover 23 comprises clips 24 for quick attachment of the cover 23 to the base 22 in recesses 25. The base is mounted rigidly on the load bar 13 by mounting means 26 represented by circles. These may simply be fastening screws. The base also includes a primary element 27 for detecting the closure of the housing, for example a magnet, a reflective patch or a pin designed to operate a switch. The base and the cover form the housing of the sensor device.

The sensor device 20 also comprises an electronic circuit 30. The components are mounted on a printed circuit 31 fixed to the cover 23 by means of fixing pins 28. These components comprise a secondary element 32 for detecting the closure of the housing, such as a reed switch controlled by a magnet, an optocoupler or a single switch. The secondary element acts in conjunction with the primary element, as shown by a curved dashed line, to deliver an electrical state representing the state of closure of the housing.

Also mounted on the printed circuit is a vibration sensor means 33, e.g. an accelerometer or a ball and contact inertial sensor, or any device for detecting movement.

A logical processing unit 34, such as a microcontroller, a radio transmitter 35 and its antenna, and a battery 36 are also inserted into the printed circuit 31 of the sensor device.

Figure 3:
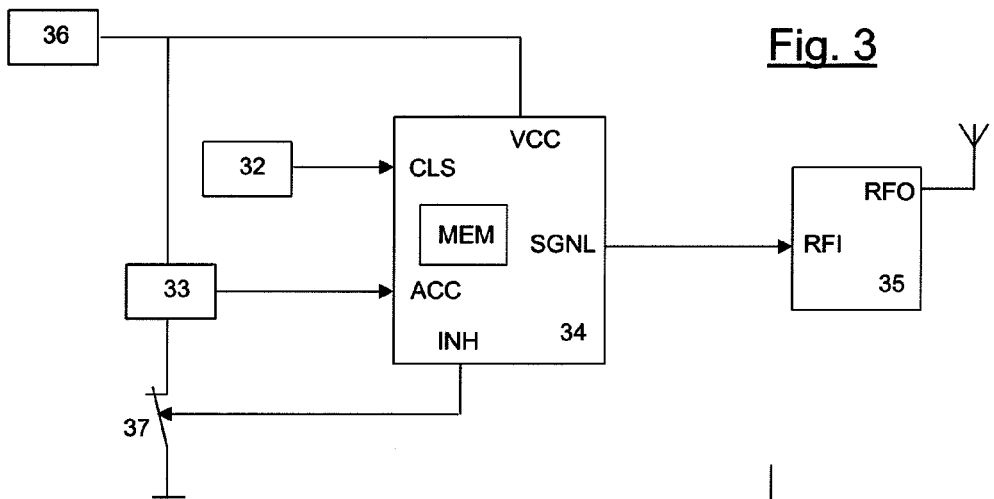
FIG. 3 is an electrical diagram of a sensor device according to the invention.

The connections between these components are detailed in FIG. 3.

The logic processing unit includes among other things software means for controlling the operation of the sensor device during its setting by the setting method to which the invention relates, one way of carrying this out being described in detail later. In particular, these software means comprise computer programs.

The logic processing unit 34 is powered by the battery 36, as is the vibration sensor means 33 if a controlled switch 37 is closed. The signals produced by the vibration sensor means 33 are transmitted to a first input ACC of the logic processing unit. The output of the secondary housing-closing element 32 is connected to a second input CLS of the logic processing unit. This input is in the low logic state while the housing is closed. In this case, the signals produced by the vibration sensor means are processed, and, if they exceed one or more predetermined threshold(s), a control signal is then transmitted from a first output SGNL of the logic processing unit to an input RFI of the radio transmitter 34, of which an output RFO supplies a radiofrequency antenna, which then transmits a safety signal "wind".

Alternatively, the first and second elements detect not the opening of the housing but its mounting at a predetermined location of the mobile structure. For example, a magnet acts as the primary element and is located at a point of the mobile structure, while a reed sensor acts as the secondary element. The primary element may also be a simple U-shaped ferromagnetic part mounted on a mobile structure, while the magnet and the reed sensor are positioned inside the housing. When the housing is placed near the ferromagnetic part, the latter channels the magnetic flux of the magnet and returns it to the reed sensor.

To allow interchangeability of housings in the event that a defective element needs replacing, all primary elements are able to interact with all secondary elements where the elements are of the same type.

If the logic input CLS changes to the high state, the logic processing unit ignores the signal produced by the vibration sensor means. In the embodiment shown in FIG. 3, a controlled opening switch 37 is controlled by an inhibiting output INH of the logic processing unit 34, the effect of which is to stop the supply to the vibration sensor means 33, and therefore stop any signal produced by the latter. Alternatively, the logic processing unit 34 may simply stop analyzing the signals present at its input ACC, or temporarily block the sending of a signal transmission command to the radio transmitter 35, or temporarily interrupt the power to the radio transmitter 35 by a means similar to the control switch 37, or by using the same control switch 37 to cut off the power to the vibration sensor means and to the radio transmitter.

Once the sensor device has been configured, its operation is such that, when movements or vibrations exceed a predetermined safety threshold, the sensor device transmits a safety signal that triggers a safety movement of the screen, for example winding it up in the case of an awning supported by arms.

Figure 4:
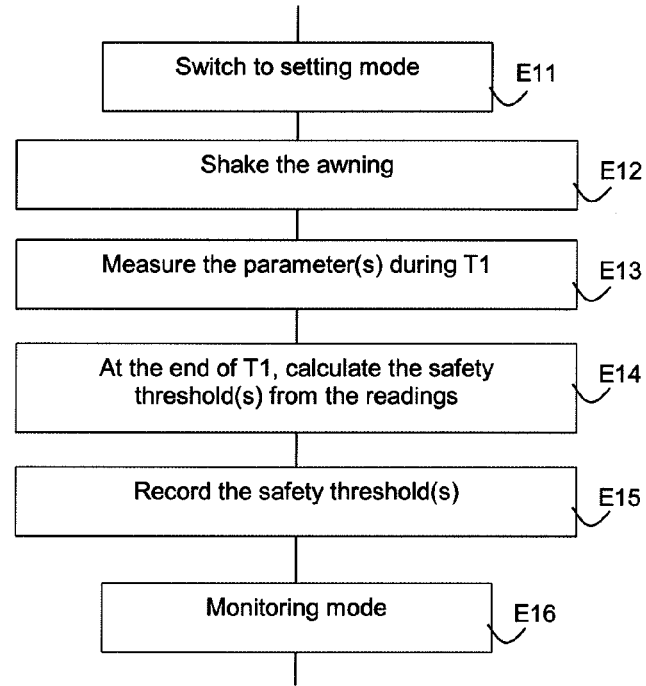
FIG. 4 is a flow chart showing one way of carrying out a method for setting a sensor device according to the invention.

One way of carrying out the setting method according to the invention is described in detail below with reference to FIG. 4.

In the first step E11, the sensor device is put in an setting mode. This can be done in various ways. For example, if the sensor device has wireless signal receiving means, a signal to enter the setting mode can be sent to it from a remote control with which it is paired. Alternatively, the sensor device may have a special switch for putting it in the setting mode when activated. Also, if the sensor device is of the type described above, it is possible that it can be triggered to enter the setting mode by a sequence of actions of removing and/or opening and fitting and/or closing the housing of the sensor device in compliance with a specified time sequence. For example, opening the housing and then closing it again less than 10 seconds after opening it may put the sensor device into setting mode as detailed below.

In the second step E12, the installer shakes the screen with the sensor device mounted on it. The movement and/or vibrations introduced by the installer by applying forces to the screen will be those which are decisive in defining a safety threshold above which the sensor device will transmit a signal, once completely configured. By construction, an awning is capable of withstanding quite violent gusts of wind, but the user perceives the shaking of the structure as alarming. It is therefore desirable for the installer to give the awning a shaking movement corresponding to what the user would regard as alarming, rather than what the awning could actually cope with.

In the third step E13, which takes place simultaneously with step E12, the signal produced by the vibration sensor means is recorded. This recording step has a predetermined duration T1 of for example between 30 seconds and 3 minutes. This duration is counted from the instant the unit enters setting mode. The data defining the signal are stored in a memory MEM of the logic processing unit 34. These data may for example be values sampled from the signal produced by the vibration sensor means.

At the end of step E13, in the fourth step E14, one or more safety threshold values are calculated from the above recording, using algorithms or empirical rules. For this purpose the logic processing unit 34 contains a calculating program stored in memory MEM enabling it to process the values previously stored in its memory.

For example, a safety threshold may be determined from the highest measured value, or from the mean of the ten highest values. Alternatively, a first safety threshold may be determined for a high oscillation frequency (or for a pulsed mode) and a second threshold may be determined for a low oscillation frequency.

These determinations of values can be done automatically as described in the above three paragraphs by an automatic sequencing of the steps.

Alternatively, step E13 may be stopped by an action of the installer, such as pressing a button on a remote control (e.g. pressing the stop button causing the actuator to stop when it is operating).

Lastly, steps E13 and E14 can be combined into a single step in which a value determined by the signal produced by the vibration sensor is continually updated. For example, this can be done by a peak detector which keeps the maximum value of the signal in memory. The most recent value obtained at the end of the step is for example the safety threshold value.

In the fifth step E15, the safety threshold value or values are recorded in the memory MEM.

In the sixth step E16, at the end of the preceding step, the sensor device automatically switches to the operating mode, termed the monitoring mode. The sensor device is now operational.

In an optional seventh step (not shown) the sensor device may tell the installer that one or more safety thresholds have been recorded and that the sensor device is operational.

Figure 5:
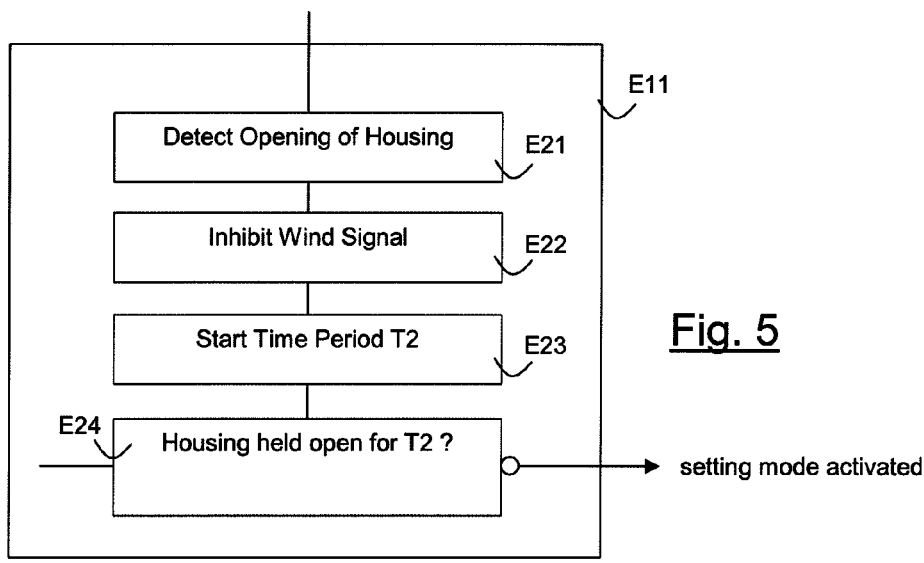
FIG. 5 is a flow chart showing one way of carrying out the first step of the setting method.

FIG. 5 details an embodiment of the first step E11 of the setting method, allowing the device to enter the setting mode.

In the first substep E21 of the step of putting the device in the setting mode, the installer opens the housing or removes it, after first opening the awning at least partially. This is detected by the detection means.

In the second substep E22, the wind safety signal is inhibited. This is to ensure that the awning does not retract automatically in response to the movements applied to the housing by the user.

In the third substep E23, a second time period T2 of short duration, for example between 2 and 10 seconds, is triggered.

In the fourth substep E24, the device tests to see whether the removal and/or opening of the housing (detected in the first substep E21) is maintained during the duration of the second time period. If it is not, and the housing has been closed again or put back in position during the duration of the second time period, then the setting mode is activated and the first step E11 is completed.

An installer who wishes to adjust the sensitivity thresholds of the sensor-transmitter must therefore carry out a very simple operation: remove the sensor-transmitter housing from its support, and put it back in place after a few seconds, alternatively open and then re-close the housing. This operation is performed while the awning is at least partly extended.

If this embodiment is used, permission to transmit the wind safety signal is re-established at the end of the sixth step E16.

The entry into the setting step may be confirmed to the user by a sensory signal: for example, an audible beep emitted by the sensor-transmitter, or preferably by the control unit 19 after the latter has received a radio message from the sensor-transmitter informing it that the setting step has begun.

The method according to the invention is applicable to screens other than awnings. It is particularly applicable to a roller awning or to a door.

The invention claimed is:

1. A method for setting a safety threshold comprising the following steps:

manual shaking of a motorized screen linked/connected to an acceleration or movement sensor device and used as a closure or as a sunshade for privacy, automatic recording during the manual shaking step of a signal produced by the sensor device that sends a safety signal when the sensed acceleration or movement sensor device exceeds a safety threshold, the safety signal causing a safety movement of the motorized screen; and automatic determination and setting of the safety threshold from said recording processed by a microcontroller.

2. The setting method as claimed in claim 1, also comprising a step of recording the safety threshold in a memory.

3. The setting method as claimed in claim 2, in which the sensor device automatically enters an operating mode at the end of the recording step.

4. The setting method as claimed in claim 1, in which the step of determining the safety threshold includes a step of determining the greatest amplitude of the signal in the recording and a step of making said signal amplitude the safety threshold.

5. The setting method as claimed in claim 1, in which the step of determining the safety threshold includes a step of determining the mean of the ten strongest amplitudes of the signal in the recording and a step of making said mean the safety threshold.

6. The setting method as claimed in claim 1, including a preliminary step of switching to setting mode, said switching being caused by:

at least one first action of removing and/or opening a housing containing the acceleration or movement sensor, followed by a second action of putting the housing back in place and/or closing it, within a predetermined time interval.

7. The setting method as claimed in claim 1, in which the end of the recording step results from the end of a time period triggered at the start of the recording or from a particular action on a remote control acting on the motorized screen.

8. A sensor device for transmitting a safety signal causing a safety movement of a motorized screen used as a closure or as a sunshade or for privacy, said device comprising hardware and software for implementing the setting method as claimed in claim 1.

* * * * *